United States Patent [19]

Kodama et al.

[11] Patent Number: 4,679,973
[45] Date of Patent: Jul. 14, 1987

[54] CRANKSHAFT MILLING MACHINE

[75] Inventors: Kazuo Kodama, Komatsu; Keishi Morikawa, Fukui, both of Japan

[73] Assignee: Kabushiki Kaisha Komatsu Seisakusho, Tokyo, Japan

[21] Appl. No.: 552,948

[22] Filed: Nov. 17, 1983

[51] Int. Cl.[4] ............................................... B23C 3/06
[52] U.S. Cl. ............................. 409/200; 51/105 SN; 82/9; 82/20; 409/203; 409/204
[58] Field of Search .............................. 82/9, 1 C, 20; 51/73 GC, 105 SP; 29/6; 409/197, 198, 199, 200, 203, 204

[56] References Cited

U.S. PATENT DOCUMENTS

| | | | |
|---|---|---|---|
| 3,727,494 | 4/1973 | Rohs | 82/20 X |
| 3,795,161 | 3/1974 | Berbalk | 82/9 |
| 3,880,025 | 4/1975 | Kralowitz et al. | 82/9 |
| 4,090,422 | 5/1978 | Berbalk | 82/9 X |
| 4,099,431 | 7/1978 | Kreucher | 82/9 |
| 4,157,055 | 6/1979 | Marzy | 82/20 X |
| 4,276,794 | 7/1981 | Berbalk | 82/9 X |
| 4,305,689 | 12/1981 | Yamade et al. | 82/9 X |
| 4,444,533 | 4/1984 | Riley et al. | 409/200 X |
| 4,494,280 | 1/1985 | Blaimschein | 409/200 X |
| 4,521,143 | 6/1985 | Schmid | 51/105 SP X |
| 4,564,323 | 1/1986 | Berbalk | 409/200 |

Primary Examiner—Gil Weidenfeld
Assistant Examiner—Glenn L. Webb
Attorney, Agent, or Firm—Armstrong, Nikaido, Marmelstein & Kubovcik

[57] ABSTRACT

A pair of opposed spindleheads are rigidly mounted on a bed for holding a crankshaft to be machined between a pair of chucks on the ends of indexing spindles. One or more, preferably two, cutter assemblies are provided between the spindleheads for movement therebetween. Each cutter assembly includes a carriage slidable along a guideway on the bed and itself having slidably mounted thereon a slide which is reciprocable in a direction normal to the axis of the crankshaft. Mounted to the slide for rotation about an axis parallel to the axis of the crankshaft is a disklike tool holder carrying a annular, rotary cutting tool in an eccentric position thereon. The cutting tool has an annular row of internal cutting edges surrounding with clearance a desired part of the crankshaft to be machined. As the cutting tool is revolved at a constant speed, the desired crankshaft part is thereby machined with the concurrent bidirectional rotation of the tool holder relative to the slide and linear, bidirectional travel of the slide relative to the carriage. The machining operation is controlled numerically.

11 Claims, 19 Drawing Figures

CRANKSHAFT MILLING MACHINE

BACKGROUND OF THE INVENTION

This invention relates to machine tools in general and, in particular, to a milling machine for use with cylindrical work. More particularly the invention deals with a milling machine of the type having a rotary annular tool with internal cutting edges for machining the crankshafts of multicylinder internal combustion engines, among other objects.

A variety of devices have been suggested and used for machining the crankpins, as well as journals, of crankshafts. Typical of such prior art machines are those suggested by U.S. Pat. Nos. 3,880,025 and 4,276,749. The former proposes the use of a compound slide mechanism, with the slides laid at right angles with each other, for the desired planetary motion of the cutting tool. As the slides are required to travel parallel to each other, however, the compound slide mechanism requires complex means to that end. An additional drawback is the great distance between the front of the machine and the aligned axis of the work holding chucks, making the operability of the machine poor.

The second mentioned U.S. patent employs two eccentric rings to provide varying degrees of eccentricity required for machining different crankpins. However, the maximum degree of eccentricity offered by this known mechanism is inconveniently small in relation to the size of the complete machine, a further increase in the degree of eccentricity being possible only by making the machine too bulky.

SUMMARY OF THE INVENTION

The present invention provides a milling machine of simplified, compact design capable of machining crankshafts or the like to very close tolerances.

The milling machine in accordance with the invention may be summarized as comprising means for holding a workpiece generally oriented in a first direction. A slide is reciprocably movable relative to the holding means in a second direction at right angles with the first direction. A tool holder is mounted to the slide for bidirectional rotation about an axis extending in the first direction. Further mounted to the tool holder in an eccentric position thereon is an annular cutting tool which also rotates relative to the tool holder about an axis extending in the first direction. The cutting tool has internal cutting edges bounding a clearance space for receiving the workpiece being held by the holding means. The milling machine further comprises means for controllably moving the slide back and forth in the second direction, means for controllably revolving the tool holder relative to the slide in opposite directions within limits, and means for revolving the cutting tool relative to the tool holder.

For machining the workpiece the slide is moved back and forth in the second direction normal to the workpiece, and the tool holder is revolved bidirectionally in prescribed relationship to the back and forth travel of the slide. Thus made to orbit around the workpiece, the cutting tool further revolves about its own axis for milling the workpiece.

In a preferred embodiment disclosed herein, in which the milling machine is adapted for machining the crankshafts or multicylinder engines, two cutter assemblies are provided for independent movement between a pair of opposed work holding means. Each cutter assembly comprises a carriage slidable along a guideway extending parallel to the axis of the crankshaft being held by the opposed work holding means, and the aforesaid combination of the slide, tool holder, and cutting tool mounted on the carriage. The slide is of course slidable on the carrige in the second direction normal to the crankshaft axis.

According to a further feature of the invention the tool holder of each cutter assembly is of disklike shape, rotatably mounted in a circular opening in the slide and itself having a circular opening defined eccentrically therein to rotatably receive the cutting tool. This construction makes each cutter assembly very compact and rigid for the accurate machining of the work. The rigidity of each cutter assembly can be further enhanced if, as in the preferred embodiment, the carriage takes the form of an integral C shaped structure, with the slide slidably caught between its two parallel walls.

The linear back and forth travel of the slide relative to the carriage, and the bidirectional rotation of the tool holder relative to the slide, must be precisely synchronized for causing the revolving cutting tool to orbit around the work along a circular path centered about the axis of the work. This objective is easy to accomplish by means of the numerical control (N/C) technique which is known per se.

The above and other features and advantages of this invention and the manner of realizing them will become more apparent, and the invention itself will best be understood, from a study of the following description and appended claims, with reference had to the attached drawings showing the preferred embodiment of the invention.

DESCRIPTION OF THE PREFERRED EMBODIMENT

Figure 1:
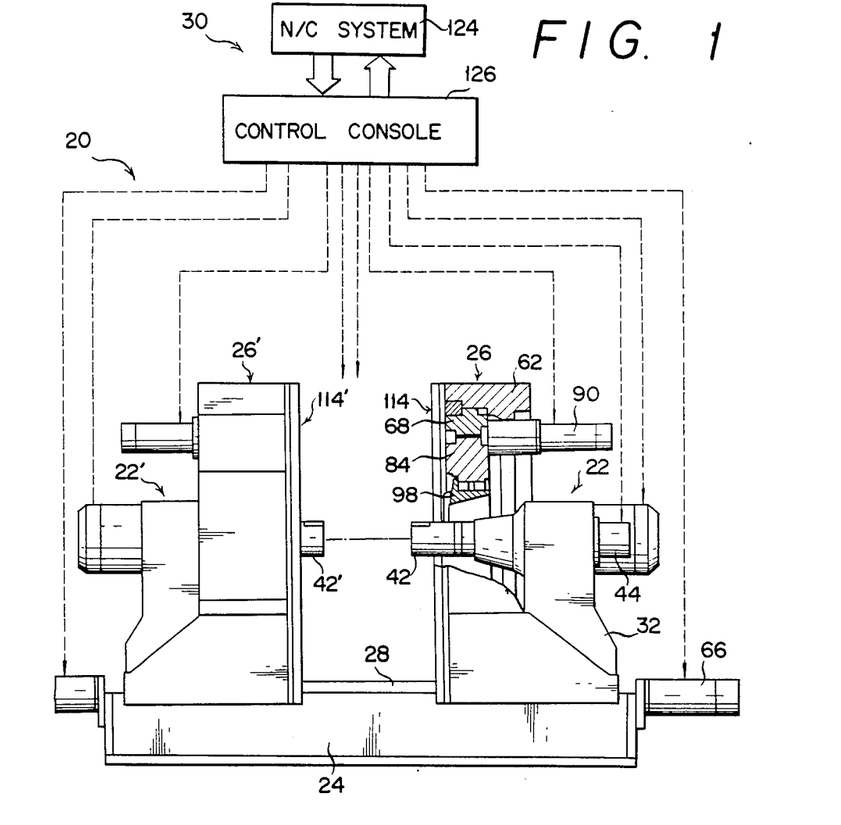
FIG. 1 is a front elevation, partly sectioned for clarity, of the crankshaft milling machine embodying the principles of this invention.

The milling machine in accordance with the invention is shown in the drawings as adapted for machining the crankpins, as well as journals, of the crankshafts of multicylinder internal combustion engines. Generally designated 20 in FIG. 1, the exemplified crankshaft milling machine broadly comprises:

1. A pair of opposed spindleheads 22 and 22' fixedly mounted on the opposite ends of a bed 24 for chucking a crankshaft, not shown in FIG. 1, therebetween with the axis of the crankshaft oriented horizontally
2. One or more, two in the illustrated embodiment, cutter assemblies 26 and 26' slidably mounted on a guideway 28 on the bed 24 for independent movement between the pair of spindleheads 22 and 22' in a direction parallel to the axis of the crankshaft supported therebetween.
3. An N/C system 30 for numerically controlling the various moving parts of the machine in accordance with a prescribed program.

The pair of spindleheads 22 and 22' are substantially (not exactly) alike in construction, so that only the right hand one 22 will be described in detail with reference to FIGS. 2 and 3, it being understood that the same description substantially applies to the left hand spindlehead 22'. The differences between the two spindleheads will be specifically pointed out in the course of the detailed discussion of the representative spindlehead 22. The parts of the left hand spindlehead will be identified, as necessary, by priming the reference numerals used to denote the corresponding parts of the right hand spindlehead 22.

Figures 2, 3:
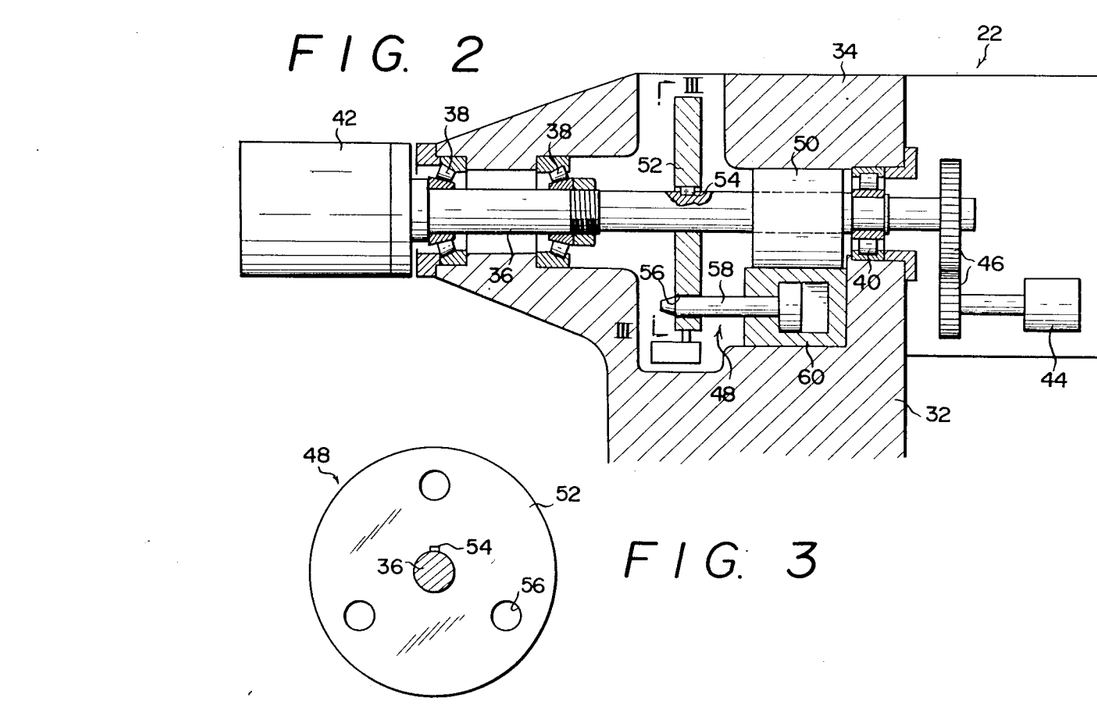
FIG. 2 is an enlarged vertical section through one of the spindleheads in the crankshaft milling machine of FIG. 1.
FIG. 3 is a section taken along the line III—III of FIG. 2 and showing the positioning mechanism therein.
Figure 4:
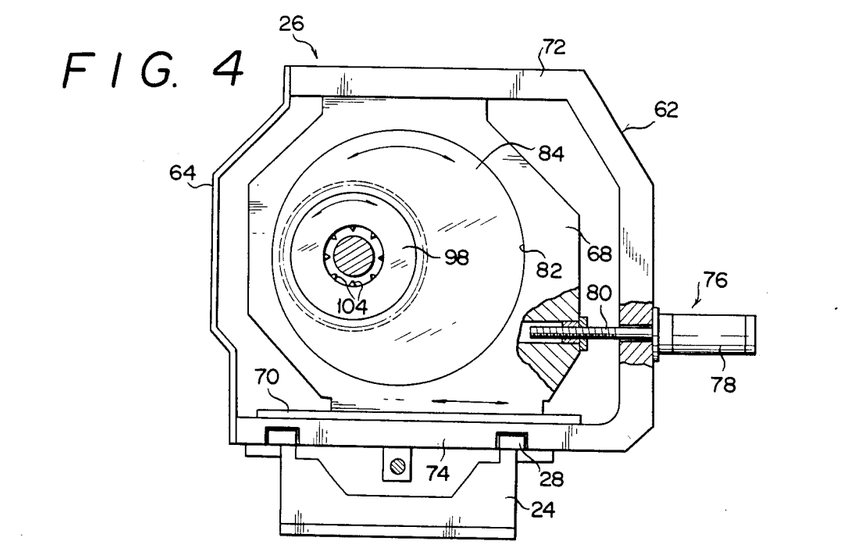
FIG. 4 is a side elevation, with parts shown in section for clarity, of one of the cutter assemblies in the crankshaft milling machine of FIG. 1.
Figure 5:
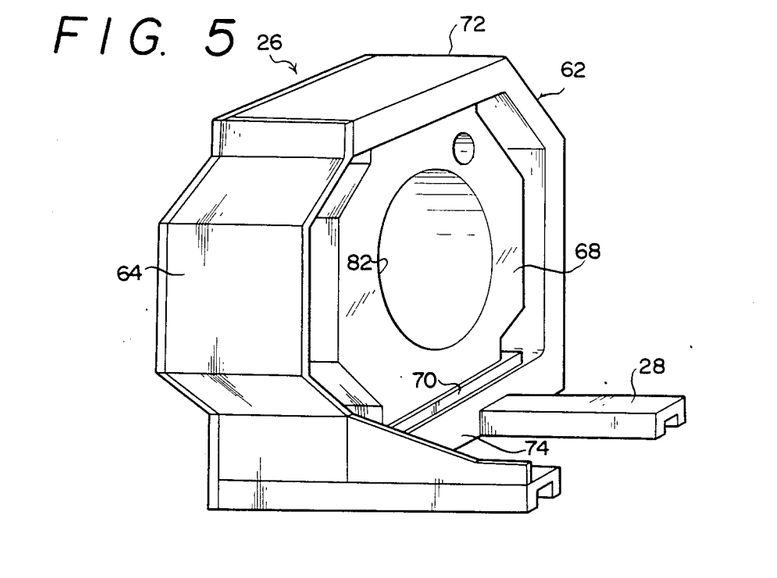
FIG. 5 is a perspective view of the cutter assembly of FIG. 4.

As drawn in a vertical section and on an enlarged scale in FIG. 2, the representative spindlehead 22 includes a column 32 with a head 34 rigidly mounted on one end of the bed 24. An indexing spindle 36 is rotatably mounted in the column head 34 via bearings 38 and 40. One end of the spindle 36, directed toward the other spindlehead 22', has a chuck 42 nonrotatably mounted thereon. The spindle 36 is in axial alignment with the spindle, not shown, of the left hand spindlehead 22', and the chucks 42 and 42' on these spindles coact to hold the crankshaft to be machined by gripping the opposite ends thereof. The other end of the spindle 36 is coupled to an indexing motor 44 via gearing 46. The left hand spindlehead 22' has no such indexing motor. Midway between the ends of the spindle 36 there are provided a positioning mechanism 48 for holding the spindle 36 in any of several preassigned angular positions, and a locking mechanism 50 for locking the spindle against angular displacement in the selected angular position despite the reactive forces to be exerted thereon during machining. The positioning mechanism 48 may be provided only on the right hand spindlehead 22 whereas the locking mechanism 50 may be provided on both right and left hand spindleheads 22 and 22'.

As will be seen also from FIG. 3, the positioning mechanism 48 has a disk 52 keyed at 54 onto the spindle 36. The disk 52 has a plurality of positioning holes 56 defined therein at constant angular spacings. FIG. 3 shows three such positioning holes 56 as the machine is intended for processing the crankshafts of six cylinder engines in this particular embodiment. Movable into and out of any of these positioning holes is the piston rod 58 of a fluid actuated positioning cylinder 60 immovably mounted within the column head 34. Under the control of the N/C system 30 the positioning cylinder 60 thrusts its piston rod 58 into one of the holes 56 in the disk 52 for positively retaining the spindle 36 in the position determined by the indexing motor 44 which also is under the control of the N/C system 30.

The pair of cutter assemblies 26 and 26' are identical in construction. Only the right hand cutter assembly 26, as viewed in FIG. 1, will therefore be described in detail, with the understanding that the same description applies to the left hand cutter assembly 26'.

While the right hand cutter assembly 26 is shown sectioned in FIG. 1, FIGS. 4 through 7 better reveal its organization. It includes a carriage 62 in the form of a rigid C shaped structure complete with a front closure 64. The carriage 62 is mounted upon the guideway 28 on the bed 24 for sliding motion therealong by being driven by a carriage drive mechanism 66, FIGS. 1 and 6, of conventional design. Mounted in the carriage 62 is a slide 68 reciprocably slidable along a guideway 70 in a direction at right angles with the guideway 28 on the bed 24 or with the axis of the crankshaft being chucked between the spindleheads 22 and 22'. The slide 68 is caught between the parallel top 72 and bottom 74 walls of the C shaped carriage 62 and so is restrained from undesired displacement relative to the same during machining. A slide drive mechanism is provided at 76 in FIG. 4 for moving the slide 68 back and forth relative to the carriage 62. The slide drive mechanism 76 comprises a bidirectional rotary actuator 78 mounted on the back of the carriage 62 and having a screw threaded output shaft 80 in threaded engagement with the slide 68.

Figure 6:
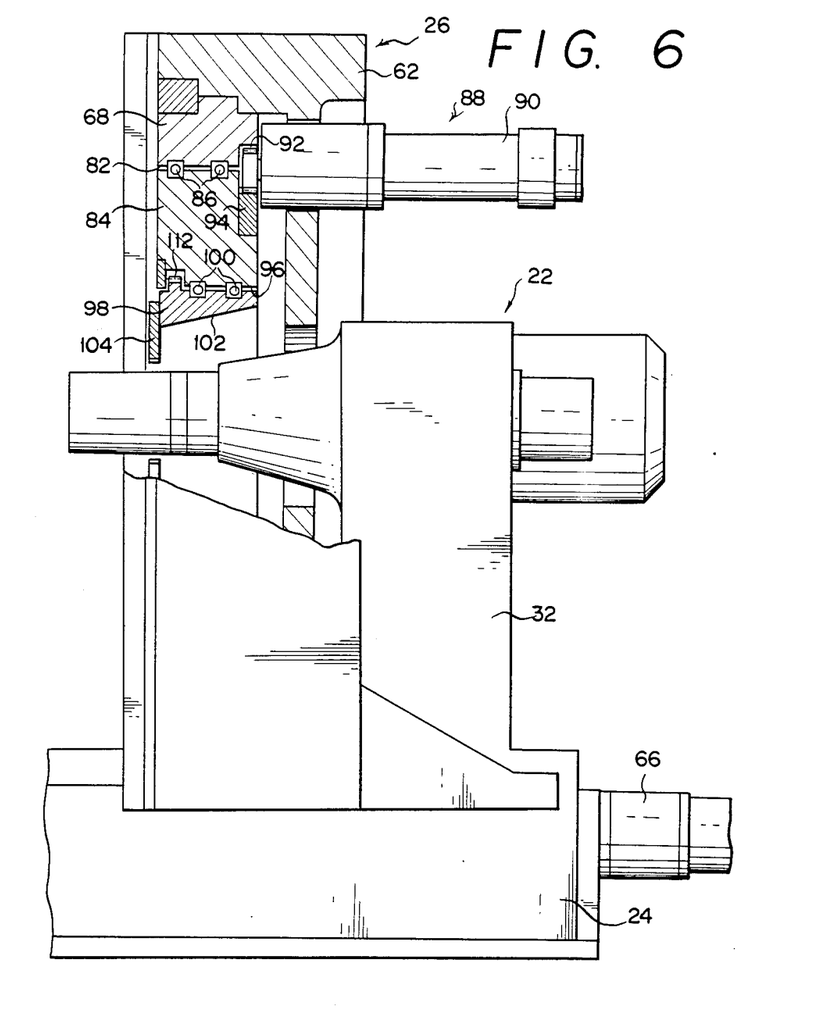
FIG. 6 is an enlarged, partial front elevation of the crankshaft milling machine of FIG. 1, showing one of the cutter assemblies in section to reveal its details.

The slide 68 has a circular opening 82 defined centrally therethrough for rotatably receiving a disklike tool holder 84 via bearings 86, FIG. 6. The tool holder 84 is to be turned bidirectionally relative to the slide 68 during machining. Provided to this end is a tool holder drive mechanism 88 shown in FIGS. 6 and 7. It includes a bidirectional rotary actuator 90 fixedly mounted to the slide 68. A pinion 92 on the output shaft of this tool holder actuator 90 meshes with a crescent shaped gear 94 affixed to the tool holder 84 in concentric relation thereto. Thus, as the tool holder actuator 90 rotates bidirectionally, so does the tool holder 84 about its axis parallel to the axis of the crankshaft being machined.

Figure 7:
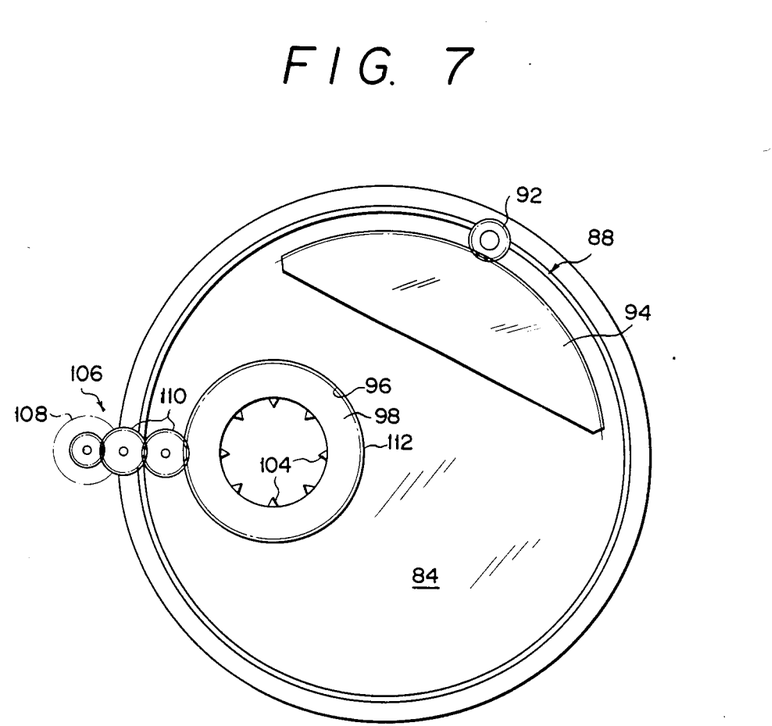
FIG. 7 is an enlarged, partial side elevation of one of the cutter assemblies in the crankshaft milling machine of FIG. 1.

The tool holder 84 has itself a circular opening 96 defined eccentrically therethrough for rotatably receiving an annular cutting tool 98 via bearings 100, FIG. 6. The cutting tool 98 has a tapered bore 102 cut centrally therethrough. An annular row of internal cutting edges 104 are provided at the smaller diameter end of the tapered bore 102. These cutting edges bound in combination a clearance space for receiving a desired part of the crankshaft to be cut. At 106 in FIG. 7 is shown a cutting tool drive mechanism for revolving the cutting tool 98 at constant speed with respect to the tool holder 84. It has a rotary actuator 108 meshing via a gear train 110 with a driven gear 112 formed on part of the outer peripheral surface of the cutting tool 98.

Figure 8:
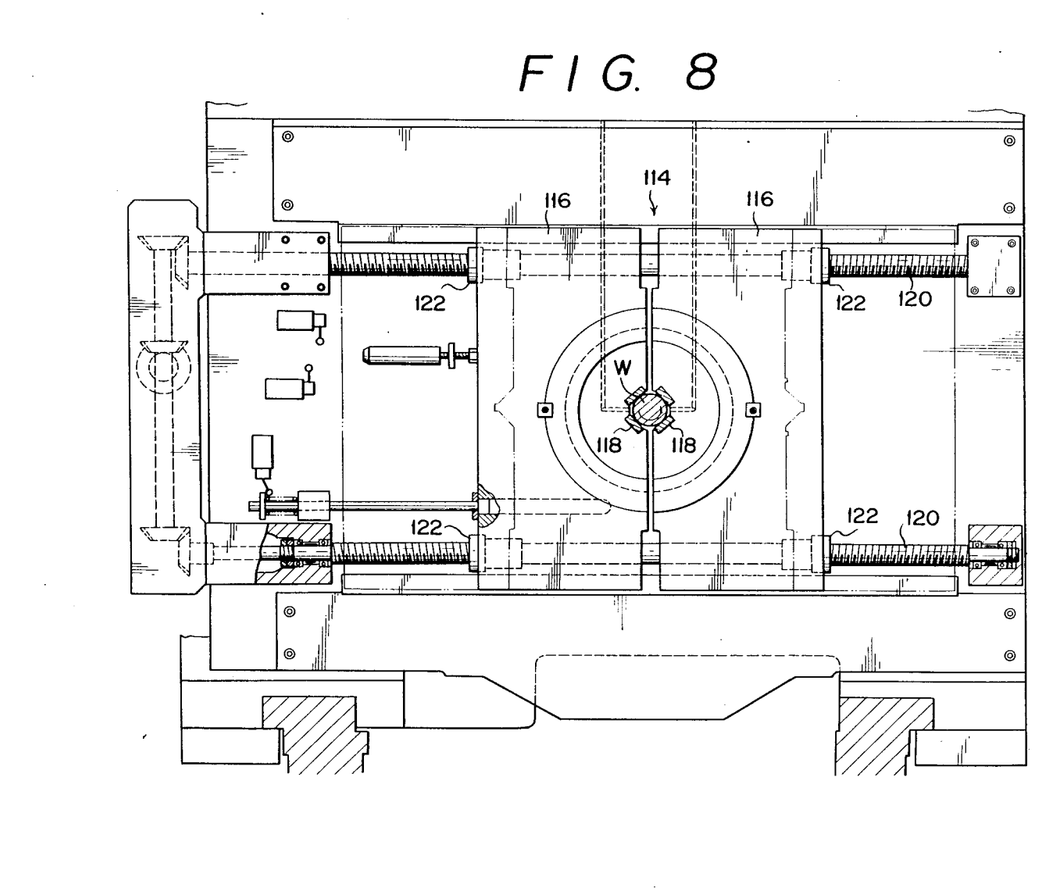
FIG. 8 is an enlarged side elevation of work gripping means provided to each cutter assembly in the crankshaft milling machine of FIG. 1.
Figure 9:
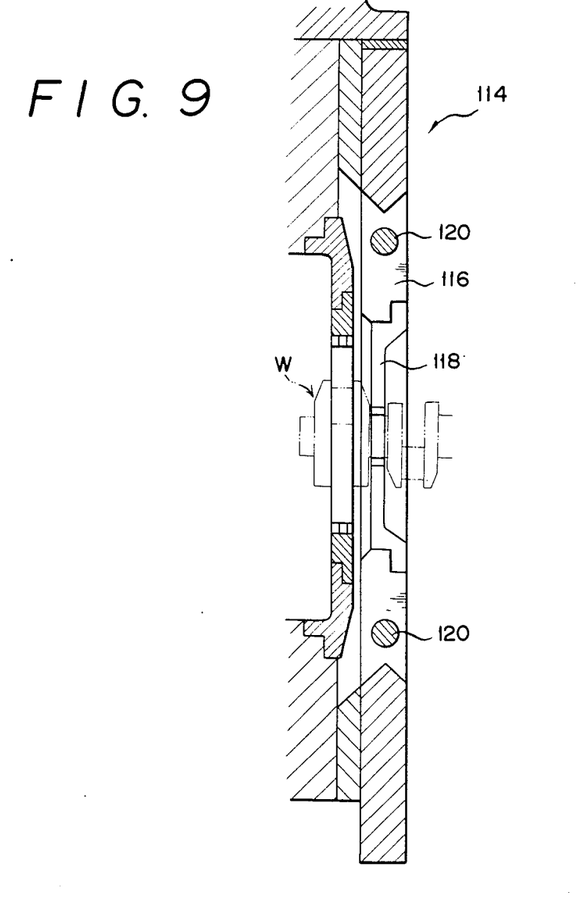
FIG. 9 is a vertical section through the work gripping means of FIG. 8.

As illustrated in FIGS. 8 and 9, the representative cutter assembly 26 is further provided with means 114 for gripping the crankshaft W during the cutting thereof. The gripping means 114 include a pair of slides 116 movable toward and away from each other along a plane normal to the axis of the crankshaft W. Each slide 116 has a pair of gripping jaws 118 arranged in right angular relation to each other. When the pair of slides 116 are moved toward each other as in FIG. 8, the two pairs of gripping jaws 118 are pressed against the crankshaft W and thus coact to grip the same therebetween.

For the movement of the slides 116 toward and away from each other there are employed a pair of worms 120 each having a pair of ball nuts 122 which are afixed to the respective slides. The synchronized rotation of the worms 120 results in the joint movement of the ball nuts 122, and therefore of the slides 116, toward or away from each other. As indicated by the reference numeral 114 and 114' in FIG. 1, the gripping means are provided on the opposed faces of the two cutter assemblies 26 and 26'.

With reference back to FIG. 1 the N/C system 30 is shown to comprise a control system proper 124 and a control console 126. The N/C system 30 controls the actuators 44, 66, 78, 90, 108, etc., in the manner set forth in the subsequent description of operation.

Figure 10A:
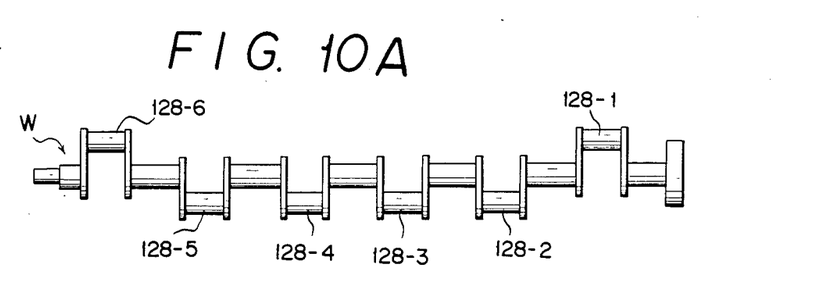
FIG. 10A is an elevation of an example of crankshaft to be cut by the milling machine of FIG. 1.
Figure 10B:
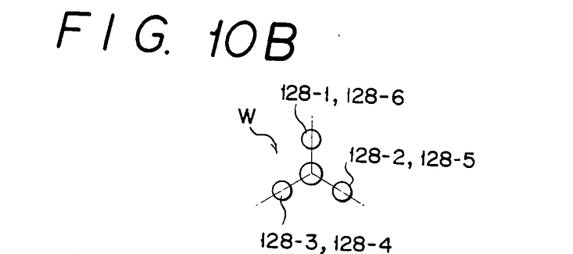
FIG. 10B is a diagrammatic end view of the crankshaft of FIG. 10A, depicting the relative angular positions of the crankpins to be machined.

FIG. 10A shows an example of crankshaft W to be machined by the illustrated milling machine 20. The exemplified crankshaft W has six crankpins 128-1 through 128-6 for use in a six cylinder engine. The relative angular positions of these crankpins are conventionally arranged as schematically depicted in FIG. 10B. The milling machine 20 can cut two of these crankpins, as well as journals, of the crankshaft W at a time by means of the two cutter assemblies 26 and 26'. The right hand cutter assembly 26 may cut the three right hand crankpins 128-1, 128-2 and 128-3, and the left hand cutter assembly 26' the three left hand crankpins 128-4, 128-5 and 128-6, one after another.

OPERATION

The crankshaft W to be machined is first chucked between the pair of spindleheads 22 and 22'. The chucked crankshaft has its axis exactly in line with the axis of the chucks 42 and 42'. Then, under the control of the N/C system 30, the indexing motor 44 is set into rotation to turn the spindles through an angle required to bring the first two crankpins to be cut, 128-1 and 128-6 for instance, to a preassigned angular position relative to the cutter assemblies 26 and 26'. The positioning cylinder 60 is also actuated to positively hold the crankshaft W in the required angular position. Since the subsequent operations of the two cutter assemblies 26 and 26' are analogous, the operation of only the right hand cutter assembly 26 will be set forth in detail, with the assumption that the crankpin 128-1 is the first to be cut thereby.

Figures 11A, 11B:
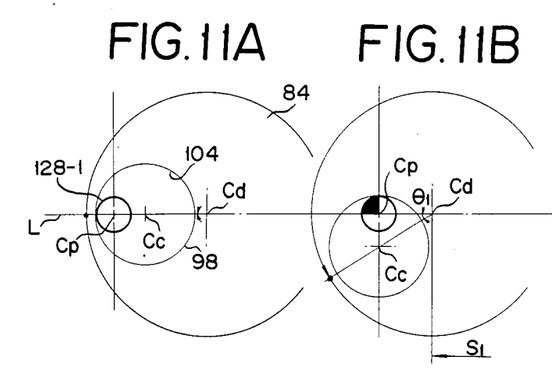
FIGS. 11A through 11E are a series of diagrammatic representations of one of the cutter assemblies useful in explaining its operation.

FIGS. 11A through 11B are explanatory of the way the first crankpin 128-1 is machined by the right hand cutter assembly 26. As will be noted from FIG. 11A, the aforesaid preassigned angular position of the crankpin 128-1 is such that its axis Cp is on a notional line L passing the axis Cd of the disklike tool holder 84 in parallel relation to the guideway 70, FIGS. 4 and 5, along which the tool holder travels relative to the carriage 62. The crankpin 128-1 remains fixed in this position throughout the process of machining.

FIG. 11A also represents an initial state of the cutter assembly 26 with respect to the crankpin 128-1, with the internal cutting edges 104 of the cutting tool 98 contacting the crankpin at a point on the line L. The center Cc of the cutting tool 98 is also on the line L. The machining of the crankpin 128-1 begins as the cutting tool drive mechanism 106, FIG. 7, starts revolving the cutting tool 98, with the slide drive mechanism 76, FIG. 4, and tool holder drive mechanism 88, FIG. 7, also set into operation, all under the control of the N/C system 30.

In FIG. 11B the slide 68 has been moved a distance S1 to the left by the slide drive mechanism 76, and at the same time the tool holder 84 has been turned an angle $\theta 1$ in a counterclockwise direction by the tool holder drive mechanism 88, from their positions of FIG. 11A. It will be seen that the crankpin 128-1 has had a first 90 degrees of its peripheral surface cut by the cutting tool 98.

Figure 11C:
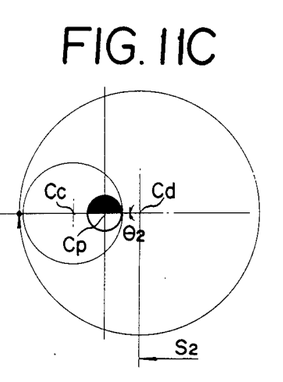

FIG. 11C shows the slide 68 subsequently moved a distance S2 to the left, and the tool holder 84 turned an angle $\theta 2$ in a clockwise direction. The center Cc of the cutting tool 98 returns to a position on the line L, with its internal cutting edges 104 contacting the crankpin 128-1 at another point on the line L. Another 90 degrees of the peripheral surface of the crankpin 128-1 has been cut.

Figure 11D:
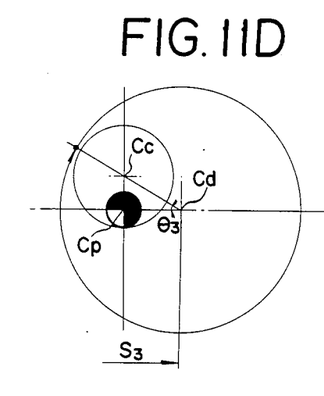

FIG. 11D shows the slide 68 further moved a distance S3 to the right, and the tool holder 84 turned an angle $\theta 3$ in a clockwise direction. Still another 90 degrees of the peripheral surface of the crankpin 128-1 has been cut.

Figure 11E:
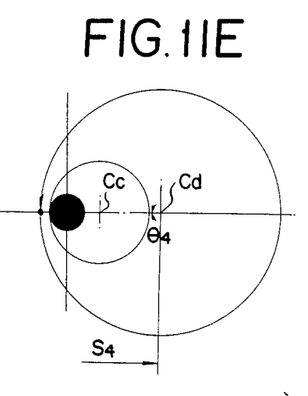

In FIG. 11E is shown the slide 68 further moved a distance S4 to the right, and the tool holder 84 turned an angle $\theta 4$ in a counterclockwise direction. The center Cc of the cutting tool 98 again returns to a position on the line L, with its internal cutting edges 104 contacting the crankpin 128-1 on the line L, just as in FIG. 11A. Thus the complete peripheral surface of the crankpin 128-1 has been machined.

The cutting cycle of FIGS. 11A through 11E is repeated until the crankpin 128-1 is cut to a prescribed depth. During each such cutting cycle the cutting tool 98 orbits around the crankpin 128-1, as schematically drawn in FIG. 12, by the combined reciprocating motion of the slide 68 and bidirectional revolution of the tool holder 84. The center of the cutting tool 98 delineates a true circle centered about the axis of the crankpin 128-1, so that the cutting tool can machine the crankpin into a cylinder of a desired diameter.

Upon completion of the machining of the first crankpin 128-1 the cutter assembly 26 may be moved along the guideway 28 on the bed 24 by the carriage drive mechanism 66 to the second crankpin 128-2. This second crankpin can of course be cut just like the first crankpin 128-1. The third crankpin 128-3 can likewise be machined. When all the crankpins 128-1 through 128-6 are machined by the two cutter assemblies 26 and 26', the chucks 42 and 42' on the spindleheads 22 and 22' may be released, and the crankshaft W may be withdrawn from the milling machine 20. It will of course be understood that not only the crankpins but also the journals of the crankshaft can be machined in a like fashion.

The following is a more detailed discussion of the way the N/C system 30 controls the slide drive mechanism 76 and tool holder drive mechanism 88 to enable the cutting tool 98 to machine the crankshaft by orbiting around the same as in the foregoing. Such discussion will be better understood by referring to FIGS. 13 and 14.

Figure 13:
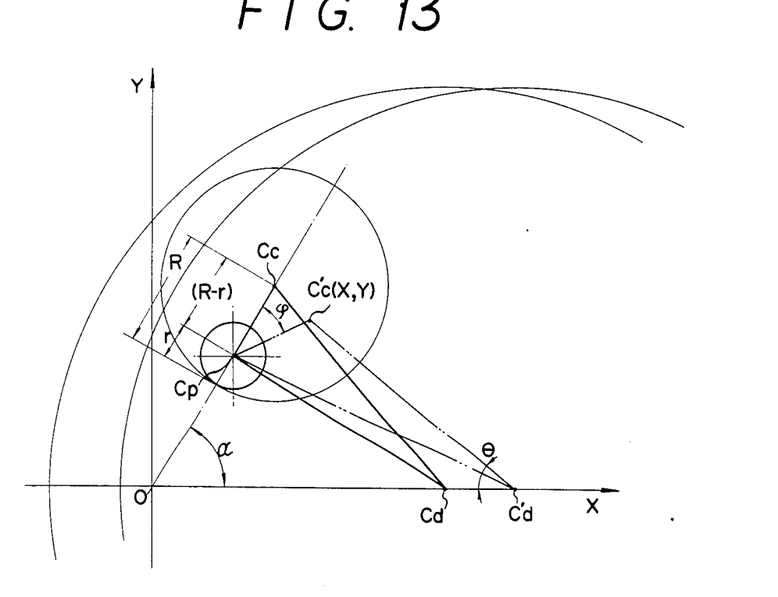
FIGS. 13 and 14 are explanatory of the way each cutter assembly cuts the crankshaft.
Figure 14:
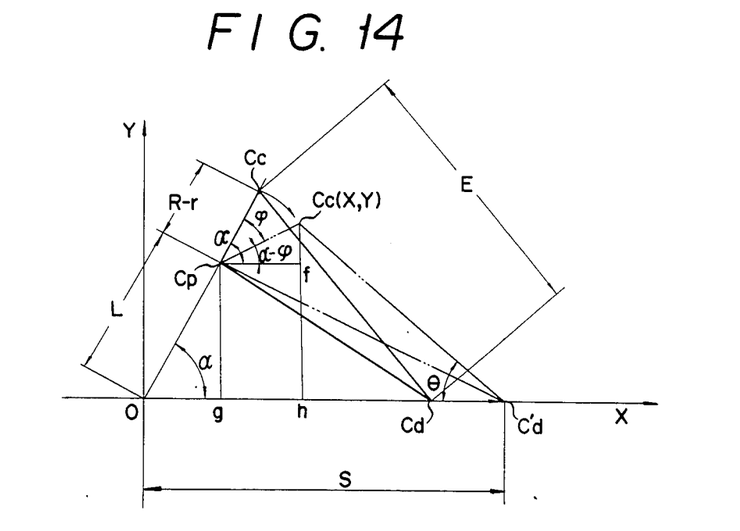

In the coordinate system of FIGS. 13 and 14 the X axis is drawn horizontally through the center Cd of the disklike tool holder 84. The Y axis intersectes the X axis at 0 where there lies the axis of the crankshaft journals. Let (L, α°) the position of the crankpin to be machined on the coordinate system. The angle $\theta$ of swing of the cutting tool 98 about the center Cd of the tool holder 84, and the distance S between the origin 0 and the center Cd of the tool holder, when the crankpin is machined through an angle of $\phi$ degrees can be computed as follows:

$$\begin{cases} X = \overline{og} + \overline{Cpf} = L \cos \alpha + (R - r) \cos (\alpha - \phi) & (1) \\ Y = \overline{Cpg} + \overline{Ccf} = L \sin \alpha + (R - r) \sin (\alpha - \phi) & (2) \end{cases}$$

$$\begin{cases} S = \overline{oh} + \overline{Cdh} = X + E \cos \theta & (3) \\ Y = \overline{Cch} = E \sin \theta & (4) \end{cases}$$

where
L = half the cutting tool stroke;
R = the radius of the cutting tool or of its internal cutting edges;
r = the radius of the crankpin being machined; and
E = the radius of swing of the cutting tool about the axis of the tool holder.

From Equations (2) and (4)

$$E \sin \theta = L \sin \alpha + (R - r) \sin (\alpha - \phi) \quad (5)$$

$$\theta = \sin^{-1} \frac{L \sin \alpha + (R - r) \sin (\alpha - \phi)}{E}$$

From Equations (1) and (3)

$$S = E \cos \theta + L \cos \alpha + (R - r) \cos (\alpha - \phi). \quad (6)$$

From Equations (5) and (6)
$\theta = F1(\phi)$
$S = F2(\theta, \phi)$.

Thus the angle $\theta$ can be detemined from a given value of the angle $\phi$. The distance S can also be obtained from $\theta$ and $\phi$.

The angle α is zero when the axis of the crankpin to be machined is on the X axis. Substituting 0 for α in Equations (5) and (6) gives $$\theta = \sin^{-1} \frac{(R - r) \sin (-\phi)}{E} \quad (7)$$

$$S = E \cos \theta + L + (R - r) \cos (-\phi). \quad (8)$$

Equations (5), (6) and (7) are used for crankshafts for six cylinder gines, and Equations (7) and (8) for those for four cylinder engines. In the above described case of machining the first crankpin 128-1, with its axis located on the X axis as in FIGS. 11A through 11E, the slide drive mechanism 76 and tool holder drive mechanism 88 are numerically controlled in accordance with Equations (7) and (8). Equations (5) and (6) are used for the subsequent machining of the second 128-2 and third 128-3 crankpins.

Figure 12:
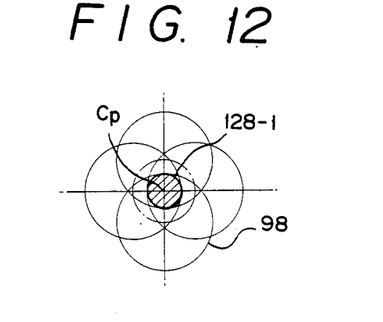
FIG. 12 is a view explanatory of the circular path traced by the annular cutting tool of each cutter assembly in cutting the crankshaft.

It has been stated in conjunction with FIG. 12 that the cutting tool 98 orbits along a circular path around the axis of the crankpin being cut. This can be proved as follows:

From Equations (1) and (2)

$$(X - L \cos \alpha)^2 = \{(R - r) \cos (\alpha - \phi)\}^2$$

$$(Y - L \sin \alpha)^2 = \{(R - r) \sin (\alpha - \phi)\}^2,$$

wherefore $$(X - L \cos \alpha)^2 + (Y - L \sin \alpha)^2 = (R - r)^2.$$

When the angle α is zero, $$(X - L)^2 + Y^2 = (R - r)^2.$$

As is evident from FIGS. 13 and 14, the axis Cd of the tool holder 84 travels rectilinearly with the reciprocating motion of the slide 68. The line along which the tool holder axis travels may not necessarily pass the axis of the crankshaft journals but may be displaced therefrom. In the latter case the above equations may be modified to take the degree of displacement of that line into account, for correspondingly controlling the motions of the slide 68 and tool holder 84.

The preferred embodiment disclosed hereinbefore admits of numeraous modifications or adaptations within the scope of the invention expressed in the following claims.

We claim:

1. A milling machine for machining crankshaft or the like, comprising
   (a) means for holding a workpiece generally oriented in a first direction;
   (b) a slide reciprocably movable relative to the holding means in a second direction at right angles with the first direction;
   (c) means for controllably moving the slide back and forth in the second direction during machining;
   (d) a tool holder rotatably mounted to the slide for rotation about an axis extending generally parallel to the first direction;
   (e) means for controllably and angularly reciprocating the tool holder relative to the slide in opposite angular directions within specific limits during machining;
   (f) an annular cutting tool rotatably mounted to the tool holder in an eccentric position thereon for bi-directional rotation about an axis extending generally parallel to the first direction, the cutting tool having internal cutting edges bounding a space for receiving with clearance the workpiece being held by the holding means; and
   (g) means for revolving the cutting tool relative to the tool holder.

2. The milling machine of claim 1 wherein the tool holder is of disklike shape and is rotatably received in a circular opening defined in the slide.

3. The milling machine of claim 2 wherein the tool holder has a circular opening defined eccentrically therein for rotatably receiving the annular cutting tool.

4. A crankshaft milling machine comprising:
   (a) a pair of opposed means for holding therebetween a crankshaft to be machined;
   (b) a carriage reciprocably movable between the pair of holding means;
   (c) a slide mounted to the carriage for reciprocating movement in a direction normal to the axis of the crankshaft;
   (d) means for controllably moving the slide back and forth relative to the carriage during milling;

(e) a tool holder rotatably mounted to the slide for rotation about an axis parallel to the axis of the crankshaft;

(f) means for controllably and angularly reciprocating the tool holder relative to the slide in opposite angular directions within specific limits during milling;

(g) an annular cutting tool rotatably mounted to the tool holder in an eccentric position thereon for bi-directional rotation about an axis parallel to the axis of the crankshaft, the cutting tool having a row of internal cutting edges bounding a space for receiving with clearance a desired part of the crankshaft to be machined; and (h) means for revolving the cutting tool relative to the tool holder.

5. The crankshaft milling machine of claim 4 wherein each of the pair of opposed holding means comprises:

(a) a fixed spindlehead;

(b) a spindle rotatably mounted to the spindlehead;

(c) a chuck on the spindle for rigidly holding the crankshaft in coaction with the chuck of the other holding means;

(d) means for imparting rotation to the spindle; and (e) means for holding the spindle against rotation in any of a plurality of preassigned angular positions.

6. The crankshaft milling machine of claim 4 further comprising:

(a) a second carriage movable between the pair of holding means independently of the first recited carriage;

(b) a second slide mounted to the second carriage for reciprocating movement in a direction normal to the axis of the crankshaft being held by the holding means;

(c) second means for controllably moving the second slide back and forth relative to the second carriage during milling;

(d) a second tool holder rotatably mounted to the second slide for rotation about an axis parallel to the axis of the crankshaft;

(e) second means for controllably and angularly reciprocating the second tool holder relative to the second slide in opposite angular directions within specific limits during milling;

(f) a second annular cutting tool rotatably mounted to the second tool holder in an eccentric position thereon for bi-directional rotation about an axis parallel to the axis of the crankshaft, the second cutting tool also having a row of internal cutting edges bounding a space for receiving with clearance another desired part of the crankshaft to be machined; and (g) second means for revolving the second cutting tool relative to the second tool holder.

7. The crankshaft milling machine of claim 4 wherein each of the first and second carriages comprises a generally rigid C shaped structure.

8. The crankshaft milling machine of claim 4 wherein the tool holder is of disklike shape and is rotatably received in a circular opening defined in the slide.

9. The crankshaft milling machine of claim 8 wherein the tool holder has a circular opening formed eccentrically therein for rotatably receiving the annular cutting tool.

10. The crankshaft milling machine of claim 4 further comprising a bed having the pair of opposed holding means rigidly mounted thereon, the bed having further formed thereon a guideway extending between the opposed holding means for the sliding motion of the carriage therebetween.

11. The milling machine of claim 1, wherein an angle $\theta$ of the specific limit of the angular reciprocation of said tool holder with regard to a predetermined starting position, and a distance S between the center of said tool holder and the axis of journals of the crankshaft, may be determined by the following equations:

$$\theta = \sin^{-1} \frac{L \sin \alpha + (R - r) \sin (\alpha - \phi)}{E}, \text{ and}$$

$$S = E \cos \theta + L \cos \alpha + (R - r) \cos (\alpha - \phi),$$

where $\phi$ = the angle through which a crankpin to be machined is machined,

L = half the stroke of the cutting tool,

R = the radius of the internal cutting edges of the cutting tool, r = the radius of the crankpin to be machined, and E = the radius of the swing of the cutting tool about the axis of the tool holder.

* * * * *